(12) United States Patent
Willems et al.

(10) Patent No.: US 10,661,208 B2
(45) Date of Patent: May 26, 2020

(54) SYSTEMS AND METHODS FOR SERVICING A FLUID FILTRATION SYSTEM

(71) Applicant: Donaldson Company, Inc., Minneapolis, MN (US)

(72) Inventors: Gert Louis Willems, Wilsele (BE); Joost Peeten, Leuven (BE)

(73) Assignee: Donaldson Company, Inc., Minneapolis, MN (US)

( * ) Notice: Subject to any disclaimer, the term of this patent is extended or adjusted under 35 U.S.C. 154(b) by 259 days.

(21) Appl. No.: 15/567,944

(22) PCT Filed: Apr. 18, 2016

(86) PCT No.: PCT/US2016/028119
§ 371 (c)(1),
(2) Date: Oct. 19, 2017

(87) PCT Pub. No.: WO2016/172049
PCT Pub. Date: Oct. 27, 2016

(65) Prior Publication Data
US 2018/0133631 A1    May 17, 2018

Related U.S. Application Data

(60) Provisional application No. 62/149,771, filed on Apr. 20, 2015.

(51) Int. Cl.
*B01D 37/04* (2006.01)
*B01D 35/153* (2006.01)
(Continued)

(52) U.S. Cl.
CPC ........... *B01D 37/045* (2013.01); *B01D 29/21* (2013.01); *B01D 29/33* (2013.01); *B01D 29/50* (2013.01);
(Continued)

(58) Field of Classification Search
CPC ...... B01D 37/045; B01D 29/21; B01D 29/54; B01D 37/04; B01D 29/58; B01D 37/046;
(Continued)

(56) References Cited

U.S. PATENT DOCUMENTS 5,053,120 A * 10/1991 Mollmann ......... B01D 17/0208
210/86
5,534,161 A    7/1996 Tarr et al.
(Continued)

FOREIGN PATENT DOCUMENTS

DE    102013100415 A1    7/2013

OTHER PUBLICATIONS

International Search Report and Written Opinion for PCT/US2016/028119 dated Sep. 1, 2016.

*Primary Examiner* — David C Mellon
(74) *Attorney, Agent, or Firm* — Merchant & Gould P.C.

(57) ABSTRACT

Fluid filtration systems and methods for servicing thereof are disclosed. The fluid filtration system includes a filter cartridge, a fluid transfer pump, and a valve assembly that can be selectively operated and positioned to achieve a normal filtration mode of operation, a fuel drain mode of operation, and a water drain mode of operation. In the normal mode, the filter cartridge is in an installed position, the pump is rotated in a first direction, and the valve is placed in a first position. In the fuel drain mode, the filter cartridge is in a service position, the pump is rotated in a second direction, and the valve is placed in a second position. In the water drain mode, the filter cartridge is in an installed position, the pump is rotated in the second direction, and the valve is placed in the first position.

10 Claims, 7 Drawing Sheets

(51) Int. Cl.
*B01D 35/16* (2006.01)
*B01D 36/00* (2006.01)
*B01D 29/58* (2006.01)
*B01D 29/54* (2006.01)
*B01D 29/21* (2006.01)
*B01D 29/33* (2006.01)
*B01D 29/50* (2006.01)
*F02M 37/32* (2019.01)
*F02M 37/28* (2019.01)

(52) U.S. Cl.
CPC .......... *B01D 29/54* (2013.01); *B01D 29/58* (2013.01); *B01D 35/153* (2013.01); *B01D 35/16* (2013.01); *B01D 36/006* (2013.01); *B01D 37/04* (2013.01); *B01D 37/046* (2013.01); *F02M 37/28* (2019.01); *F02M 37/32* (2019.01); *B01D 2201/0415* (2013.01); *B01D 2201/165* (2013.01); *B01D 2201/295* (2013.01); *B01D 2201/305* (2013.01); *B01D 2201/316* (2013.01)

(58) Field of Classification Search
CPC ...... B01D 29/50; B01D 29/33; B01D 36/006; B01D 35/16; B01D 35/153; B01D 2201/305; B01D 2201/316; B01D 2201/0415; B01D 2201/295; B01D 2201/165; B01D 17/04; B01D 17/045; B01D 27/14; B01D 27/146; B01D 27/148; B01D 27/108; B01D 27/08; B01D 29/56; B01D 29/52; B01D 29/13; B01D 29/15; B01D 29/23; B01D 29/31; B01D 29/35; B01D 29/60; B01D 29/88; B01D 29/885; B01D 29/96; B01D 35/005; B01D 35/12; B01D 35/157; B01D 35/1573; B01D 35/143; F02M 37/22; F02M 37/24; F02M 37/26; F02M 37/28; F02M 37/32; F02M 37/36; F02M 37/42; F02M 37/44

See application file for complete search history.

(56) References Cited

U.S. PATENT DOCUMENTS

| | | | |
|---|---|---|---|
| 5,746,184 A * | 5/1998 | Ekstam | F02M 37/20 |
| | | | 123/510 |
| 5,922,199 A | 7/1999 | Hodgkins | |
| 6,174,438 B1 | 1/2001 | Hodgkins et al. | |
| 2001/0004061 A1 | 6/2001 | Popoff et al. | |
| 2014/0263106 A1* | 9/2014 | Hampton | B01D 29/50 |
| | | | 210/798 |
| 2016/0230733 A1* | 8/2016 | Grange | F02M 63/029 |
| 2017/0204821 A1 | 7/2017 | Willems et al. | |
| 2018/0008912 A1* | 1/2018 | Spelter | B01D 35/26 |

* cited by examiner

SYSTEMS AND METHODS FOR SERVICING A FLUID FILTRATION SYSTEM

This application is a National Stage application of PCT International Patent application No. PCT/US2016/028119, filed Apr. 18, 2016, which and claims priority to U.S. Provisional patent application Ser. No. 61/249,771, filed Apr. 20, 2015, which applications are incorporated herein by reference. To the extent appropriate, a claim of priority is made to each of the above disclosed applications.

BACKGROUND

Fluid filters, in particular fuel filters, are known in the prior art. Fuel filters, for example, can be part of a low pressure fuel system of a combustion engine deployed for example in a vehicle. Although fuel filter assemblies configured to drain water and fuel are known, improvements are desired.

SUMMARY

A fluid filtration system and methods for servicing the system are disclosed. In one example, the fluid filtration system includes a housing defining a receiving area that also has a first port, a second port, and a third port. The first and third ports are configured for connection to a fuel reservoir tank while the second port is configured for connection to a fuel rail of an internal combustion engine. The fluid filtration system also includes a filter cartridge including a first filter element and a second filter element disposed within the housing receiving area, wherein the filter cartridge has an installed position and a service position. The system may also include a reversible transfer pump having first and second rotational directions and a valve assembly having first and second positions.

In one aspect, the fluid filtration system is operable in a normal mode of operation and a fuel drain mode of operation, when the fluid filtration system is installed in a fuel delivery system. In the normal mode of operation, the filter cartridge is in the installed position, the valve assembly is in the first position, and the transfer pump is operated in the first direction such that fuel can be drawn from the first port, through the first filter element, valve assembly, transfer pump, the second filter element, and delivered to the second port. In the fuel drain mode of operation, the filter cartridge is in the service position, the valve assembly is in the second position, and the transfer pump is operated in the second direction such that fuel can be drained from the receiving area, through the transfer pump and valve assembly, and delivered to the third port when the internal combustion engine is not operating.

The fluid filtration system can also include a housing having a fourth port connected to a pressure-actuated water drain valve, wherein the system is operable in a water drain mode of operation. In the water drain mode, the filter cartridge is in the installed position, the valve assembly is in the first position, and the pump is operated in the second direction such that fuel can be drawn from the third port, through the pump and valve assembly, and through the first filter element to pressurize and force separated and collected water through the pressure-actuated water drain valve.

A method for servicing a filter cartridge having a filter element disposed within a receiving space of a housing is also disclosed. The method can include the steps of determining that an internal combustion engine associated with the filter cartridge is in an non-operative state; sensing a pressure drop within the receiving space; receiving an indication to initiate a fuel drain operational mode; moving a valve assembly from a first position to a second position; reversing a rotational direction of a transfer pump to drain fuel from the receiving space through the valve assembly such that the fuel is delivered to a reservoir tank associated with the internal combustion engine; deactivating the transfer pump after a predetermined period of time; and removing the filter cartridge from the housing receiving space after at least some of the fuel has been drained by the transfer pump.

A method for draining collected water from a filter cartridge having a filter element disposed within a receiving space of a housing is also disclosed. The method can include the steps of determining that an internal combustion engine associated with the filter cartridge is in an non-operative state; sensing a collected water level has been achieved within the receiving space; and reversing a rotational direction of a transfer pump to pressurize fuel within the filter element to force the collected water through a pressure-activated drain valve.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure is directed to a fuel delivery system 1 including a fluid filter arrangement 7, and related methods. Fluid filter arrangements 7 described herein are further described in commonly assigned U.S. provisional patent application No. 62/654,909, and incorporated herein by reference.

Figure 1:
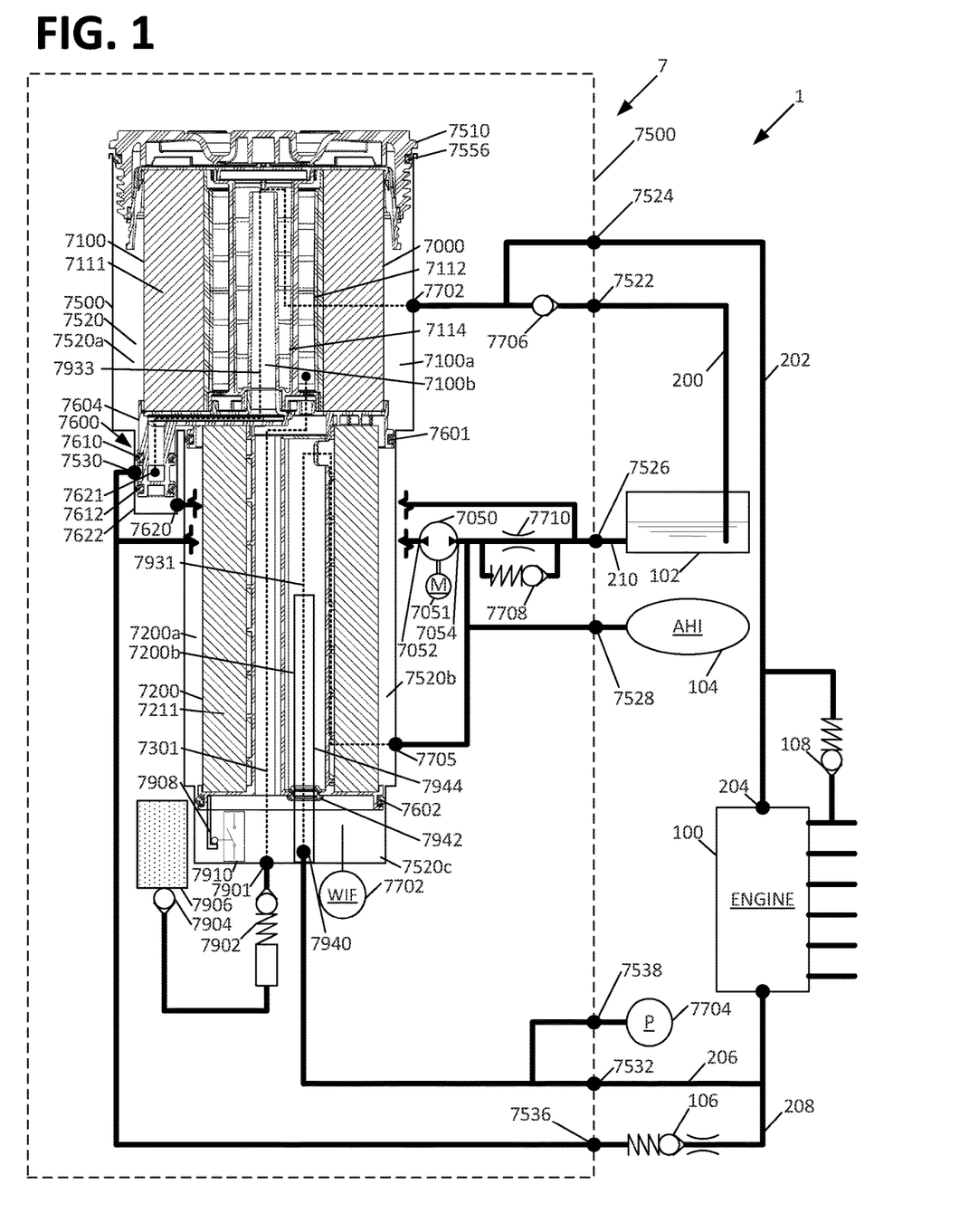
FIG. 1 is a schematic of a fuel delivery system including a fluid filter arrangement having features that are examples of aspects in accordance with the principles of the present disclosure.

As presented in the schematic at FIG. 1, the fuel delivery system 1 can additionally include an internal combustion engine 100, a fuel reservoir tank 102, and a hydrocarbon injection system 104. As discussed previously, the fuel delivery system 1 may also include a reversible fuel transfer pump 7050 for pumping fuel from the reservoir tank 102, through the first and second filter elements 7100, 7200, and to the internal combustion engine 100. In the embodiment shown, the transfer pump 7050 is oriented such that the pump 7050 is downstream of the first filter element 7100 and upstream of the second filter element 7200 in a normal mode of operation. As shown, the transfer pump 7050 has a first port 7052 in fluid communication with the first filter element 7100 and a second port 7054 in fluid communication with the second filter element 7200. As shown, the pump 7050 is driven by a motor 7051.

In one aspect, the fluid filter arrangement 7 can be provided with a housing 7500 defining a receiving space 7520 within which a fuel filter cartridge 7000 can be disposed. The fuel filter cartridge 7000 can be provided with an attached cover 7510 having a seal 7556 for sealing the fuel filter cartridge 7000 within the receiving space 7520. In the example shown, the fuel filter cartridge 7000 can include a first filter element 7100 having a first filter media 7111 and can include a second filter element 7200 having a second filter media 7211. As shown, the first filter element 7100 is also provided with a hydrophilic screen 7112 and a hydrophobic screen 7114 for the purpose of water separation.

In one example, the fluid filter cartridge 7000 is characterized by the first filter element 7100 and/or the second filter element 7200 being configured for outside-in fluid flow. In a filter element configured for outside-in fluid flow, fluid is provided to an outer periphery of the filter element (unfiltered or upstream side 7100a, 7200a), enters the filter element through this outer periphery and exits the filter element typically on an inner periphery surrounding an open filter interior (filtered or downstream side 7100b, 7200b). In the example shown, both the first filter element 7100 and the second filter element 7200 are configured for outside-in fluid flow.

In addition to seal 7556, further seals 7601 and 7602 can also be provided such that the first receiving space 7520 is divided into a first receiving space 7250a defined between seals 7556 and 7601, a second receiving spaced 7520b defined between seals 7601 and 7602, and a third receiving space 7520c defined between seal 7602 and the bottom of the housing 7500. Once the filter cartridge is fully installed, the first filter element 7100 is disposed within the first receiving space 7520a and the second filter element 7200 is disposed within the second receiving space 7520b.

The third receiving space 7520c functions as a water collection space that receives and stores water removed and drained by the first filter element screens 7112, 7114 via a flow path 7301 extending through the first and second filter elements 7100, 7200 and between the screens 7112, 7114. During operation, filtered fuel initially passes into and fills receiving space 7520c and flow path 7301. Subsequently, the fuel is then slowly displaced by water as water is separated by screens 7112, 7114. The third receiving space 7520c is also shown as receiving a water-in-fuel sensor 7702 which can provide an indication of the amount of water being stored by the third receiving space 7520c.

Preferably, the outlet of the water collecting space 7520c is provided with or connected to a pressure-actuated drain valve 7902 via a port 7901. The outlet of this pressure-actuated drain valve 7902 can be connected with an inlet of a device 7906, which can be a water purification filter 7906, a water tank, and/or an environmental fluid container. In one example, device 7906 is a water purification filter 7906 containing active carbon. A check valve 7904 may be provided to prevent the backflow of water from the water purification filter 7906. In one aspect, the fluid filter arrangement 7 can be provided with a plurality of input and output ports to interconnect the fluid filter arrangement 7 with the other various components of the fuel delivery system, as explained below.

A first port 7522 may be provided in the housing 7500 of the fluid filter arrangement 7. The first port 7522 is in fluid communication with the filter cartridge receiving space 7520a, via internal port 7702, which is the upstream or unfiltered side 7100a of the filter media 7111 of the first filter element 7100. In the embodiment shown, a branch line 200 is connected to the first port 7522 to place the receiving space 7520a in fluid communication with a fuel reservoir tank 102. This configuration allows fuel drawn from the fuel reservoir tank 102 by the transfer pump 7050 to be directed to the first filter element 7100. In one aspect, a check valve 7706 can be provided between the first port 7522 and the receiving space 7520a to prevent fuel from flowing from the receiving space 7520a to the reservoir tank 102. However, it is noted that check valve 7706 could also be provided external to the filter housing 7500 in branch line 200 and that branch lines 200 and 202 could also be connected externally, such that port 7524 could be eliminated.

A second port 7524 may be provided in the housing 7500 of the fluid filter arrangement 7. Similar to the first port 7522, the second port 7524 is also shown as being in fluid communication with the receiving space 7520a. A branch line 202 may be provided and connected to the second port 7524 such that the receiving space 7520a is placed in fluid communication with a fuel recirculation port 204 and a high pressure return spring check valve assembly 108 associated with the internal combustion engine 100. This configuration allows unused fuel from the fuel rail of the internal combustion engine 100 to be returned to the fluid filter arrangement 7.

A third port 7532, discussed previously, may also be provided in the housing 7500 of the fluid filter arrangement 7. The third port 7532 is in fluid communication with the fuel outflow path 7931 of the fluid filter arrangement 7, and thus receives fuel that has been passed through both the first and second filter elements 7100, 7200. A branch line 206 may be provided and connected to the third port 7532 that places the outflow path 7931 in fluid communication with the fuel rail of the internal combustion engine 100. This configuration allows fully filtered fuel to be delivered to the fuel rail of the internal combustion engine 100.

A fourth port 7536 may also be provided in the housing 7500 of the fluid filter arrangement 7. The fourth port 7536 is in fluid communication with the pathway 7933 and the transfer pump first port 7052, which is on the upstream side of the transfer pump 7050, when in the normal mode of operation. The fourth port 7536 is also in fluid communication with the third port 7532 via branch line 208 which includes a spring check valve assembly 106. This configuration allows for some of the fuel leaving the third port 7532 to be recirculated back to the upstream side of the transfer pump 7050, when the fuel exceeds a predetermined pressure, as set by the spring check valve assembly 106. This operation protects the transfer pump 7050 and other system components from being exposed to unduly high pressures.

A fifth port 7538 may also be provided in the housing 7500 of the fluid filter arrangement 7. The fifth port 7538 is in fluid communication with the third port 7532 and is shown as being configured to receive a pressure sensor 7704. The pressure sensor 7704, at this location, can be used by a controller 7920 or an electrical circuit (not shown) to disable the operation of the transfer pump 7050 such that the pump 7050 is not operated in a low pressure condition when fuel may not be present. The pressure sensor can also be used to monitor the pressure of the filtered fuel being delivered to the internal combustion engine 100 via port 7532 in the normal mode of operation.

A sixth port 7528 may also be provided in the housing 7500 of the fluid filter arrangement 7. The sixth port 7528 is in fluid communication with the second port 7054 of the transfer pump 7050 at a location between the first and second filter elements 7100, 7200. As such, the sixth port 7528 receives fuel that has been filtered by the first filter element 7100, but not by the second filter element 7200 in the normal mode of operation. The sixth port 7528 can be placed in fluid communication with a hydrocarbon injection system 104 that is used to inject fuel into exhaust from the internal combustion engine for the purpose of reducing emissions.

A seventh port 7526 may also be provided in the housing 7500 of the fluid filter arrangement 7. As shown, the seventh port 7526 is in direct fluid communication with a port 7620 of a bypass valve structure 7600 and is also in fluid communication with the reservoir tank 102 via branch line 210. The seventh port 7526 is also shown as being in fluid communication with an orifice restriction 7710 and a spring check valve 7708 that allow for limited flow between the tank 102 and the second side 7054 of the transfer pump 7050, the operation of which will be described in further detail below.

The fluid filter arrangement 7 may also be provided with a bypass valve structure 7600 having a first port 7530 in fluid communication with the upstream/unfiltered side 7200a of the second filter element 7200 via electrical pump 7050 and port 7705, a second port 7620 in fluid communication with the reservoir tank 102 via port 7526, and a third port 7621 in fluid communication with the clean side 7100b of the main filter cartridge 7100. As shown in FIGS. 1-4, the valve structure 7600 includes a receiving area 7622 defined in the housing 7500 and an outlet tube 7604 formed as part of the first filter element 7100. The outlet tube 7604 defines a portion of the pathway 7933 and is provided with seals 7610 and 7612 on opposite sides of the port 7621, wherein the seals 7610, 7612 seal the outlet tube 7604 to the receiving area 7622. When the filter cartridge 7000 is fully installed, the valve structure 7600 is in a first position in which the seals 7610, 7612 block fluid communication between second port 7620 and the port 7530 and pathway 7933 while allowing ports 7621 and 7530 to be in fluid communication with each other.

Figure 3:
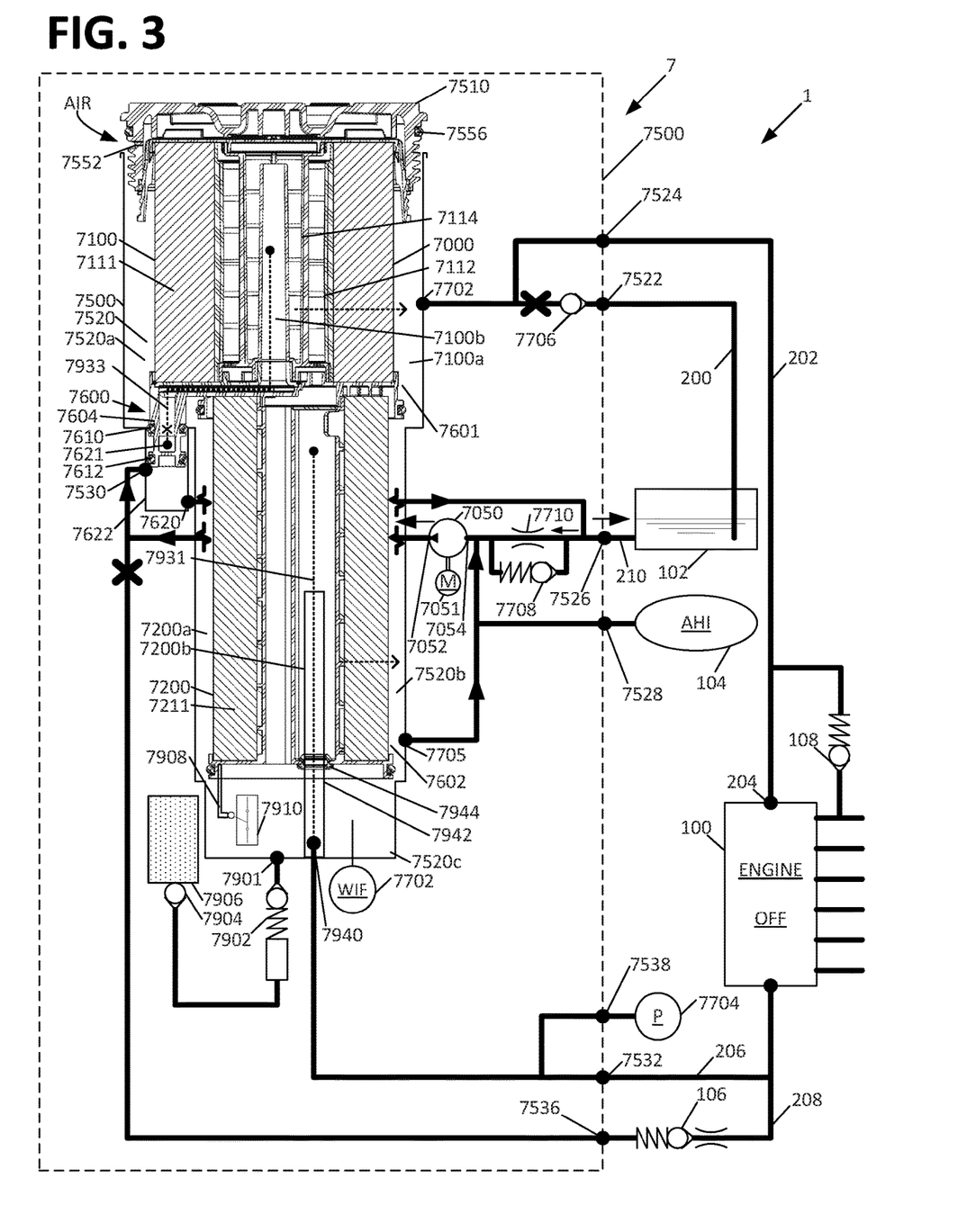
FIG. 3 is a schematic of the fuel delivery system of FIG. 1 in a fuel drain operational mode.
Figure 3A:
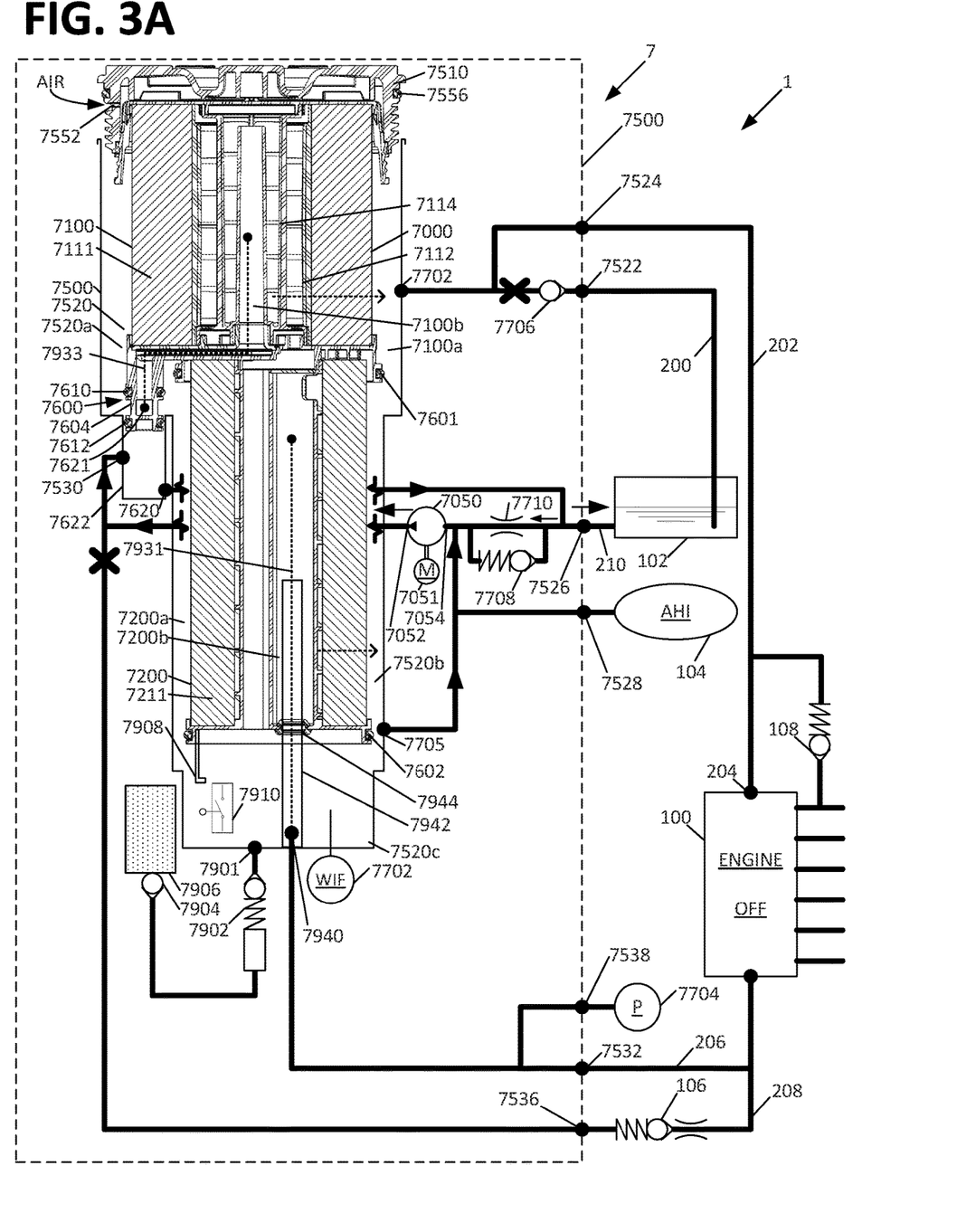
FIG. 3A is a schematic of the fuel delivery system of FIG. 1 in a fuel drain operational mode.

When the filter cartridge 7000 is lifted or partially lifted to a service position, as shown in FIG. 3, the valve structure 7600 is in a second position in which the outlet tube 7604 is lifted from the receiving area 7622 such that first and second ports 7530 and 7620 are placed in fluid communication with each other. In this position, the third port 7621 is blocked from fluid communication from both ports 7620, 7530. Lifting of the filter cartridge 7000 to the service position also causes the seals formed between the filter cartridge 7000 and the seals 7556, 7601, and 7602 to be broken. As a result, the first, second, and third receiving areas 7520a, 7520b, 7520c are joined together as a single receiving area 7520 in fluid communication with internal port 7705. Referring to FIG. 3A, the service position can include a further lifted position such that the third port 7621 is open to the receiving area 7520 rather than being blocked. This configuration would allow for the clean fluid in pathway 7933 to drain into the receiving area 7520 such that this fluid can also be drained.

Figure 5:
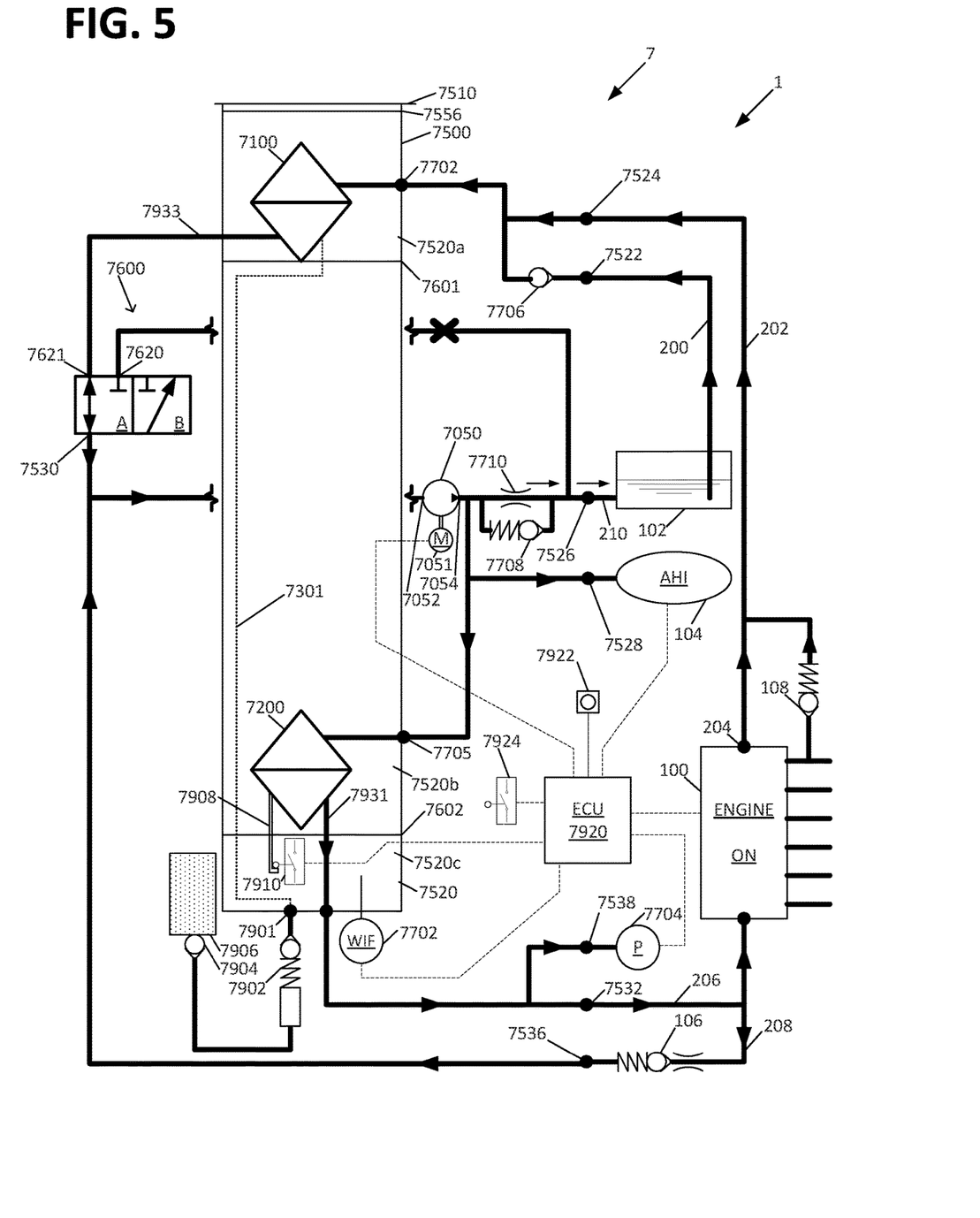
FIG. 5 is a schematic of the fuel delivery system of FIGS. 1 and 2 in the normal operational mode.
Figure 6:
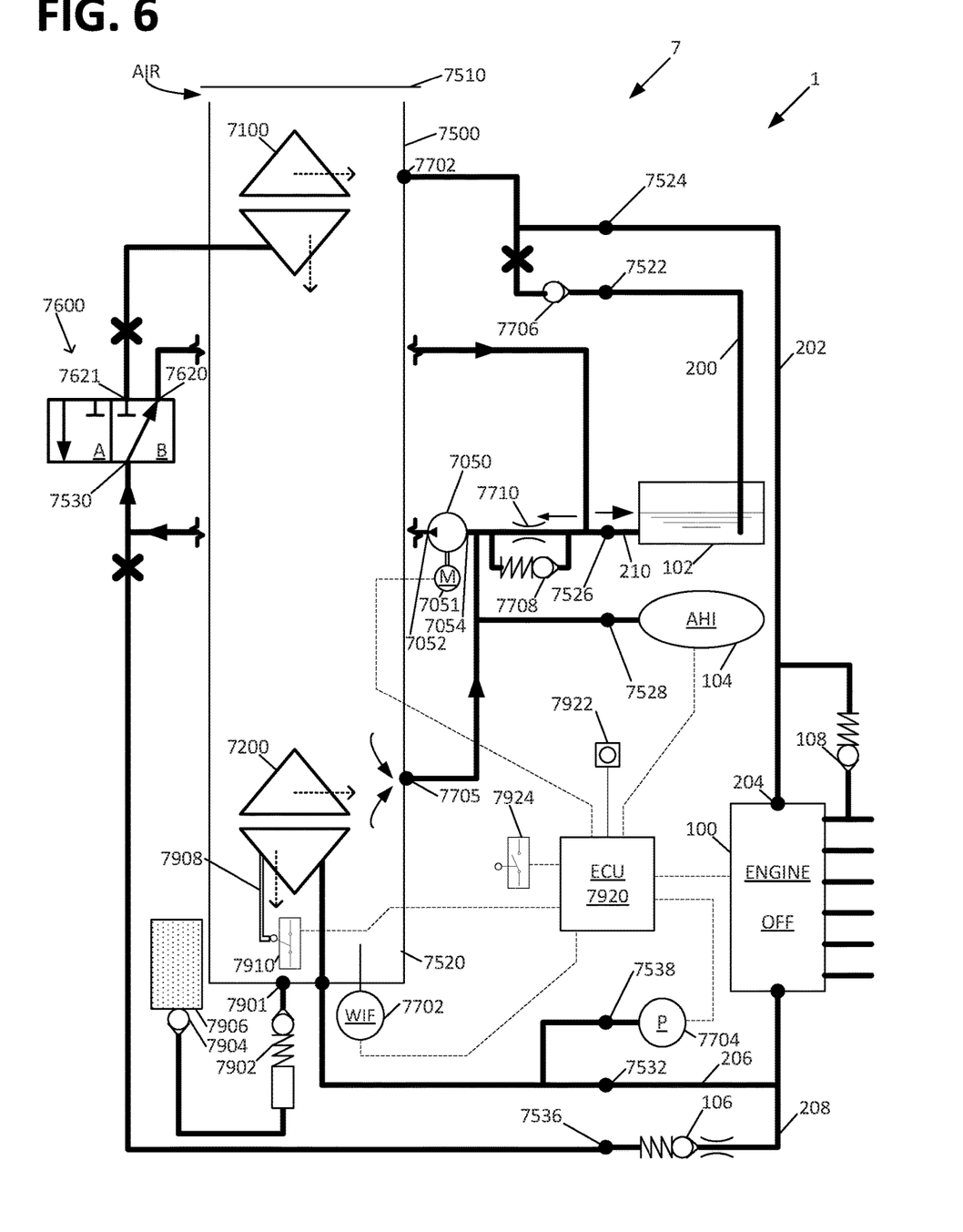
FIG. 6 is a schematic of the fuel delivery system of FIGS. 1 and 3 in the fuel drain operational mode.

As shown in a more schematic representation at FIGS. 5-6, the valve structure 7600 may be characterized as being a separate or integral three-port, two position valve having a first position A and a second position B. In the first position A, which can be used for the normal operation mode or a forced water drain mode, the fluid pathway 7933 at port 7621 is in fluid communication with the port 7530 while port 7620 is blocked. This position is shown at FIG. 5. In the second position B, which can be used for a fuel drain mode, ports 7620 and 7530 are placed in fluid communication with each other while port 7621 is blocked. The valve structure 7600 may be configured to operate manually through the lifting motion of the filter cartridge, as previously described, or may be configured as a control valve operated by an actuator, such as a solenoid actuator.

Referring to the schematics shown at FIGS. 5 and 6, the fluid filter arrangement 7 can be used in conjunction with an electronic control unit 7920, which may be an independent, dedicated controller for the arrangement 7 or may be part of a vehicle automation and control system. In one embodiment, the electronic control unit 7920 may in include a processor and a non-transient storage medium or memory, such as RAM, flash drive or a hard drive. The memory is for storing executable code, the operating parameters, and potential inputs from an operator interface, while the processor is for executing the code. Electronic control unit 7920 is configured to be connected to a number of inputs and outputs that may be used for implementing the various modes described below. As shown, the engine 100, the pressure sensor 7704, the water-in-fuel sensor 7702, the hydrocarbon injection system 104, a position switch 7910 (discussed below), an indicator lamp 7922 (discussed below), and an activation switch 7924 (discussed below) are shown as being inputs/outputs to the control unit 7920.

Normal Operational Mode

Figure 2:
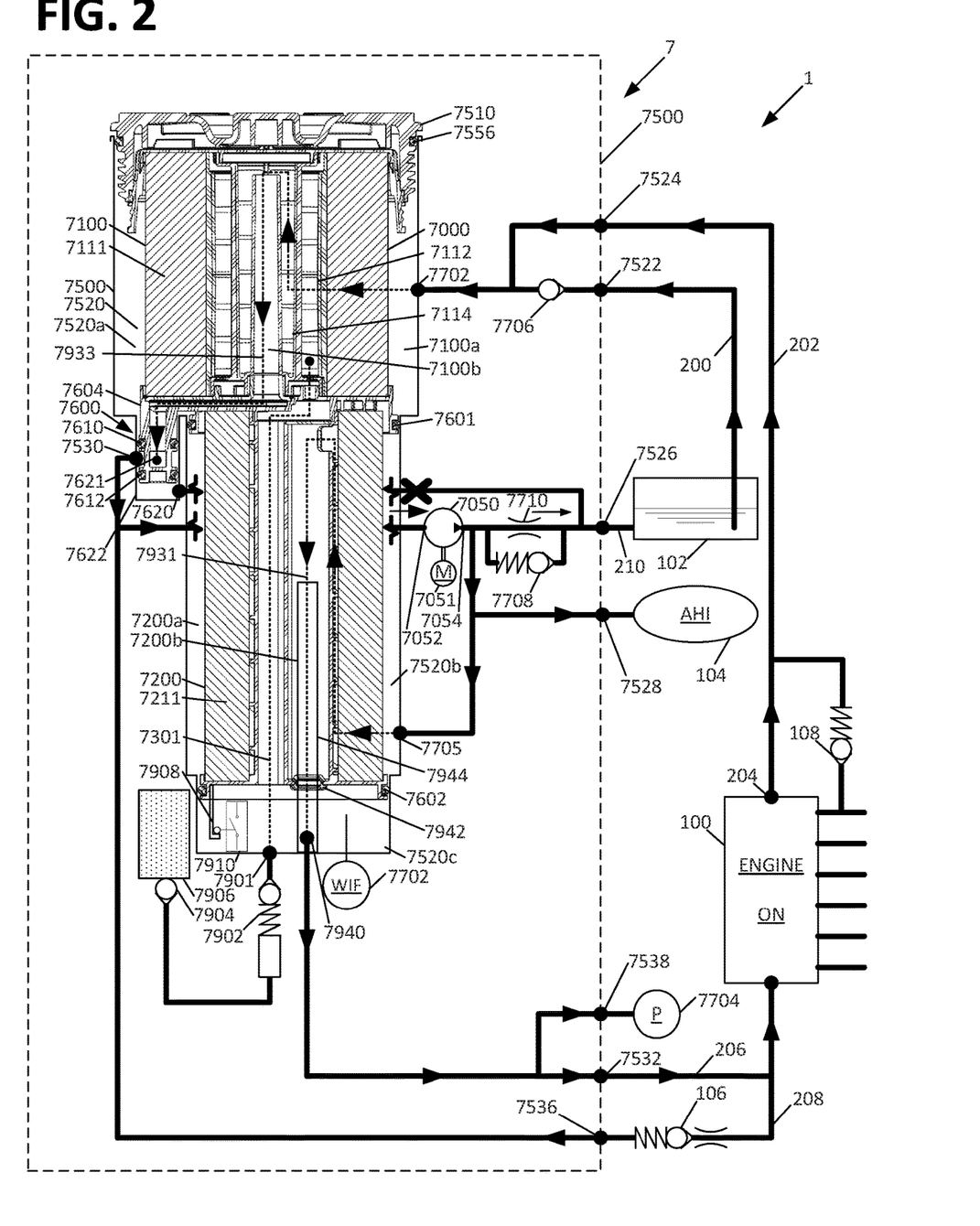
FIG. 2 is a schematic of the fuel delivery system of FIG. 1 in a normal operational mode.

As previously discussed, the fluid filter arrangement 7 can be placed in a normal mode of operation. This operational mode is shown at FIGS. 2 and 5. In the normal mode of operation, the engine 100 is in an operational state and the transfer pump 7050 is operating in a first direction such that fuel is pumped from the first port 7052 to the second port 7054. The operation of the pump 7050 causes fuel to be drawn from the tank 102 and through the first filter element 7100 via pathway 7933 and port 7530. The pump 7050 receives the fuel from pathway 7933 and port 7530 of the valve structure 7600 and pumps the fuel to internal port 7705 in fluid communication with pathway 7931 such that the fuel is filtered through the second filter element 7200. After leaving the filter at port 7940 and the housing 7500 at port 7532, the fully filtered fuel can be directly utilized by the engine 100, recirculated back to the fluid filter arrangement 7 via second port 7524 or valve 108, and/or recirculated back to the transfer pump 7050 via port 7536. As discussed previously, the transfer pump 7050 also delivers fully filtered fuel to port 7538 and fuel that has been filtered by the first filter element 7100 at ports 7526 and 7528 in the normal operational mode.

In the normal operational mode, the bypass valve structure 7600 is in the first position (or position A) such that flow through port 7620 is prevented. Also, a small amount of fuel is delivered from the pump back to the tank 102 via orifice 7710 such that a minimum tank flow is maintained in multiple tank configurations to ensure that the multiple tanks act as one single tank.

Service Mode

The fluid filter arrangement 7 can also be placed in a service mode of operation such that the fuel within the receiving space 7520 and filter cartridge 7000 can be drained by the transfer pump 7050 before replacing the filter cartridge 7000. By using the pump 7050, the fuel can be drained more rapidly than systems which rely upon gravity only for draining. This operational mode is illustrated at FIGS. 3 and 6. Through the use of a controller 7920 or electrical circuitry (not shown), the service mode can be initiated when a service switch or button 7924 is depressed and/or when a service mode is indicated through a user interface (e.g. a laptop connected to the controller 7920). The pressure sensor 7704 can also be utilized such that the service mode is not allowed to initiate until the pressure drops below a predetermined set point.

In one method of servicing the fluid filter arrangement 7, the service cover 7510 is at least partially removed from a remaining portion of the housing 7500. This can be accomplished by unscrewing the threaded engagement between the cover 7510 and a remaining portion of the housing 7500. When this is done, vent holes 7552 in the service cover 7510 are exposed. This allows air to flow into the interior volume of the housing 7500 such that a vacuum is not created during fuel draining.

Unthreading of the cover 7510 also causes the filter cartridge 7000 to be lifted into the service position. As stated previously, lifting the filter cartridge 7000 into the service position also places the port 7620 leading to the fuel tank 102 in fluid communication with port 7530 of the valve structure 7600. However, it is noted that seal 7612 is still sealed against receiving area 7622 such that receiving areas 7622 and 7520 are not in direct fluid communication with each other. Referring to the example shown at FIG. 6, it can be seen that the valve structure 7600 is moved to position B (manually or by a controller) which also places ports 7620 and 7530 in fluid communication with each other, but also operates to block flow at port 7621 such that fluid from pump 7050 is not pumped in reverse through the first filter element 7100.

Additionally, when the cartridge 7000 is moved to the lifted or service position, the seals formed between the filter cartridge 7000 and the seals 7556, 7601, and 7602 are broken. As a result, the first, second, and third receiving areas 7520a, 7520b, 7520c are joined together as a single receiving area 7520 in fluid communication with internal port 7705. In this position of the filter cartridge 7000, the pressure sensed at pressure sensor 7704 will drop, which can be used as an indication that the service mode can move to the next operational step in which the rotation of the transfer pump 7050 can be reversed. As stated above, the system can also be configured to prevent the reversal of transfer pump 7050 until the pressure falls below a predetermined set point.

In one example, button or switch 7924 is provided to enables an operator to request the drain cycle and the pump 7050 is activated in the reverse direction after the sensed pressure has dropped below the predetermined set point. Optionally, the electronic control unit can be programmed to first run the pump 7050 at a low speed (when the engine 100 is off) such that pressure builds at the pressure sensor 7704 in such a way that when the cover 7510 is removed, the resulting pressure drop is more easily sensed at the sensor 7704. This approach can be helpful in systems having an orifice 7710 installed, as some pressure naturally bleeds off to the tank via orifice 7710 when the pump 7050 is inoperative, thereby increasing the difficulty in sensing a pressure drop due solely to opening cover 7510.

In the examples shown, a position switch 7910 within the housing 7500 can be provided and connected to the controller 7920 or other circuitry. The position switch 7910 can be used to initiate the service mode and cause the pump 7050 to operate in reverse. In one example, the position switch 7910 can be configured such that the switch is open (e.g. FIGS. 1, 2, and 4-5) when the filter cartridge 7000 is fully installed and such that the switch 7910 is closed by an arm 7908 or other structure attached to the cartridge 7000 when the cartridge 7000 is in the service position (e.g. FIGS. 3, 6). The switch 7910 and arm 7908 can be further configured such that the switch is in an open position once the cartridge 7000 is further removed beyond the service position such that pump operation can be disabled while removing the cartridge 7000. This position is shown at FIG. 3A for exemplary purposes. However, it should be understood that when the position in FIG. 3A is defined as being the service position, the switch 7910 and arm 7908 would be in the position shown in FIG. 3 and would not be in the position shown at FIG. 3A until further removal of the cartridge 7500.

Once the rotation of the pump is reversed, fuel and any collected water (above port 7705) are drawn from the combined receiving area 7520, through port 7705 and into the second port 7054 of the transfer pump 7050. The fuel is then pumped by the transfer pump 7050 to ports 7530 and 7620, which are now in fluid communication with each other, and to the reservoir tank 102 via port 7562. With this operation, fuel drained from the receiving area 7520 to the reservoir tank 102. At least some of the fuel present on the filtered side 7100b of the first filter element 7100 and the filtered side 7200b of the second filter element 7200 can drain in a reverse direction towards the respective unfiltered sides 7100a, 7200a where the fuel can then be drained into port 7705 via the receiving area 7520. To the extent that this drainage does not occur (e.g. due to the presence of internal stand pipes), any remaining filtered fuel in the first filter element 7100 will discharge through the tube 7604 while any remaining filter fuel in the second filter element 7200 will drain out of the port 7940 once the filter cartridge 7000 is more fully withdrawn from the housing 7500.

It is noted that check valves 106, 7706, 7708, 7902 prevent reverse flow through their associated pathways/branch lines when the transfer pump 7050 is operating in the reverse direction. It is also noted that a stand pipe 7942 and a seal or grommet 7944 may be provided to ensure that a seal is formed between the clean side 7200b of the filter element 7200 and the receiving area 7520 when the filter cartridge 7000 is lifted into the service position. This configuration protects the engine 100 from exposure to any water or unfiltered fuel that has entered the receiving area 7520 by preventing those fluids from entering port 7940. This configuration also ensures this condition from occurring when a new filter cartridge 7500 is installed into the receiving space, as the new filter cartridge 7500 would first need to be installed onto the stand pipe 7942 before being fully inserted into the receiving are 7520.

In one example, the transfer pump 7050 is configured to run for a predetermined time period after being activated in the reverse direction. An indicator lamp 7922 can also be provided to let an operator know that the drain cycle has been initiated (e.g. lamp is red) and completed (e.g. lamp is green) and that the filter cartridge 7000 can be removed. Once the drain cycle has been completed, the pump 7050 can be deactivated and subsequently returned to normal service after the installation of a new filter cartridge 700.

Water Drain Operational Mode

Figure 4:
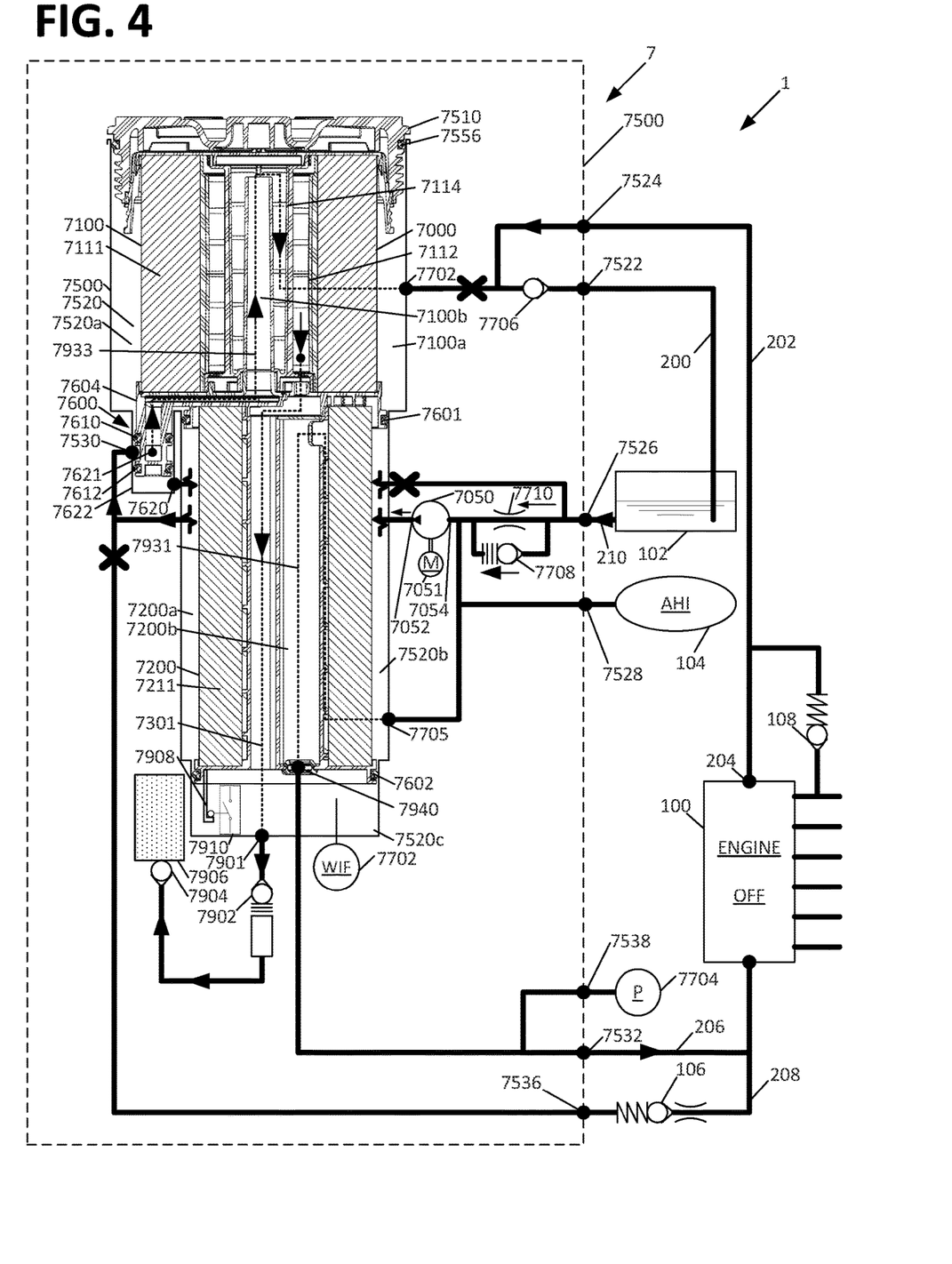
FIG. 4 is a schematic of the fuel delivery system of FIG. 1 in a water drain operational mode.

The fluid filter arrangement 7 can also be placed in a forced water drain mode of operation such that water present in the receiving or water collection space 7520c can be forced into the water purification filter 7906 with the transfer pump 7050. This mode of operation is shown at FIG. 4. In one example, and through the use of a controller or electrical circuitry (not shown), the water drain mode can be initiated when the water-in-fuel sensor 77 senses water and when the engine is shut down, whereby the transfer pump 7050 can be operated in the reverse direction. The initiation of the water drain mode can also be dependent on other predetermined system conditions, such as a minimum sensed air, fuel, and/or water temperature to prevent freezing conditions.

As the spring-check valve 7902 provides a resistance to draining, the valve 7902 operates as a pressure-actuated drain valve that allows the passage of water from the first filter element 7100 and water collecting space 7520c via pathway 7301 only when the water reaches or exceeds the actuation pressure of the valve 7902. In this way, it can be ensured that water is drained only when a predetermined pressure is reached or exceeded. To generate this pressure, the transfer pump 7050 can be operated in the reverse direction in a similar manner as previously described for the fuel drain operational mode, but with the cover closed. Alternatively, the valve 7902 may also be configured as a two-position actuated valve that is controlled by the electronic control unit 7920 to open and close when the water drain mode is initiated and terminated.

Once the transfer pump 7050 has been reversed, fuel is pumped in the reverse direction from port 7052 and into port 7530. Fuel flow is blocked from flowing out of port 7530 to port 7536 by operation of the check valve 106. Additionally, the pump pressure forces the spring check valve 7708 open such that the tank port 7526 is in fluid communication with the port 7052 of the transfer pump 7050. This allows the tank 102 to provide any necessary fuel required to implement the water drain mode. Alternatively, a system can be configured in which no tank port 7526 is provided, for instance in case of a single fuel tank reservoir being provided instead of a dual tank reservoir. In such a case, the fuel between the fuel pump and high pressure common rail system could serve as a reservoir of fuel available to support the water drain mode. This fuel source would still allow the transfer pump to pull the necessary amount of fuel in order to pressurize the water/fuel mixture inside the primary filter as typically only about 40 ml of water is drained during a water drain mode and an expansion volume of about 100 ml is available between the fuel pump and high pressure common rail system.

In the water drain mode, the fuel pumped by the transfer pump 7050 is forced into the tube 7604 and through passageway 7933 to the clean side 7100b of the first filter element 7100. Alternatively, and as shown at FIG. 5, the transfer pump 7050 pumps fluid into the valve structure 7600 which is held in position A such that ports 7621 and 7530 are open to each other and such that port 7620 is blocked. This pumping action forces fuel from the clean side 7100b towards the unfiltered side 7100a of the first filter element 7100. As the check valve 7706 prevents any of the pumped fluid from exiting port 7702, the pumped fuel is entirely forced into the water drain and collection flow path 7301. This condition causes a pressure buildup sufficient to open valve 7902 such that the collected water can drain into the water purification filter.

The water drain cycle can be terminated when the WIF sensor 7702 no longer detects water, or after a predetermined period of time has passed. Once the water drain cycle has been completed, the pump 7050 can be deactivated and subsequently returned to normal service.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A fluid filtration system comprising:
   a. a housing defining a receiving area and having a first port, a second port, and a third port, the first and third ports being configured for connection to a fuel reservoir tank, the second port being configured for connection to a fuel rail of an internal combustion engine;
   b. a filter cartridge including a first filter element and a second filter element disposed within the housing receiving area, the filter cartridge having an installed position and a service position;
   c. a reversible transfer pump having first and second rotational directions; and
   d. a valve assembly having first and second positions;
   e. the fluid filtration system being operable in a normal mode of operation and a fuel drain mode of operation, when the fluid filtration system is installed in a fuel delivery system, wherein:
      i. in the normal mode of operation, the filter cartridge is in the installed position, the valve assembly is in the first position, and the transfer pump is operated in the first direction such that fuel can be drawn from the first port, through the first filter element, valve assembly, transfer pump, the second filter element, and delivered to the second port;
      ii. in the fuel drain mode of operation, the filter cartridge is in the service position, the valve assembly is in the second position, and the transfer pump is operated in the second direction such that fuel can be drained from the receiving area, through the transfer pump and valve assembly, and delivered to the third port when the internal combustion engine is not operating.

2. The fluid filtration system of claim 1, wherein:
   a. the housing includes a fourth port connected to a pressure-actuated water drain valve;
   b. the fluid filtration system being further operable in a water drain mode of operation in which the filter cartridge is in the installed position, the valve assembly is in the first position, and the pump is operated in the second direction such that fuel can be pressurized in the first filter assembly to force separated and collected water out through the pressure-actuated water drain valve.

3. The fluid filtration system of claim 2, further comprising:
   a. a check valve disposed between the first port and the transfer pump such that the transfer pump is prevented from delivering fuel directly to the first port when the pump is operated in the second direction and such that the transfer pump is allowed to draw fuel from the first port when the transfer pump is operated in the first direction.

4. The fluid filtration system of claim 2, wherein:
   a. the first filter element is provided with one or more water separation screens to separate water from fuel drawn from the first port; and
   b. the second filter element is provided with an internal passageway to allow water separated by the first filter element to flow to the fourth port.

5. The fluid filtration system of claim 2, further comprising:
   a. a water-in-fuel sensor to detect a level of collected water, wherein the water drain mode of operation is configured to be initiated when:
      i. the water-in-fuel sensor detects a predetermined level of collected water;
      ii. the internal combustion engine is not operating; and
      iii. at least one other predefined system condition is sensed.

6. The fluid filtration system of claim 1, wherein:
   a. the position of the valve assembly is dependent upon the position of the filter cartridge, such that the valve assembly is in the first position when the filter cartridge is in the installed position and is in the second position when the filter cartridge is in the service position.

7. The fluid filtration system of claim 6, wherein:
   a. the valve assembly is formed by a portion of the first filter element and by a portion of the housing.

8. The fluid filtration system of claim 1, further comprising:
   a. a pressure sensor to detect a pressure of the fuel proximate the second port, wherein the fuel drain mode of operation is configured such that the transfer pump is prevented from being reversed to the second direction until the pressure sensed at the pressure sensor falls below a predetermined set point.

9. The fluid filtration system of claim 1, wherein:
   a. the fluid filtration system is configured to be placed in the fuel drain mode of operation by one of a user interface and a mechanical switch.

10. The fluid filtration system of claim 1, further comprising:
    a. a check valve disposed between the first port and the first filter element, the check valve allowing flow from the first port to the first filter element and preventing flow from the first filter element to the first port.

* * * * *